United States Patent
Bothien et al.

(10) Patent No.: US 10,247,420 B2
(45) Date of Patent: Apr. 2, 2019

(54) AXIALLY STAGED MIXER WITH DILUTION AIR INJECTION

(71) Applicant: ANSALDO ENERGIA SWITZERLAND AG, Baden (CH)

(72) Inventors: Mirko Ruben Bothien, Zürich (CH); Luis Tay Wo Chong Hilares, Neuenhof (CH); Adnan Eroglu, Untersiggenthal (CH); Bruno Schuermans, La tour de Peilz (CH); Michael Düsing, Rheinfelden (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 358 days.

(21) Appl. No.: 14/970,857

(22) Filed: Dec. 16, 2015

(65) Prior Publication Data
US 2016/0178207 A1    Jun. 23, 2016

(30) Foreign Application Priority Data

Dec. 22, 2014  (EP) ..................................... 14199765

(51) Int. Cl.
| | | |
|---|---|---|
| F02C 7/18 | (2006.01) |
| F23R 3/34 | (2006.01) |
| F23R 3/00 | (2006.01) |
| F23R 3/06 | (2006.01) |
| F23R 3/12 | (2006.01) |
| F23C 6/04 | (2006.01) |
| F23C 9/08 | (2006.01) |

(52) U.S. Cl.
CPC ............... *F23R 3/346* (2013.01); *F02C 7/18* (2013.01); *F23C 6/042* (2013.01); *F23C 9/08* (2013.01);
(Continued)

(58) Field of Classification Search
CPC .. F23R 3/06; F23R 2900/00014; F23R 3/346; F23R 3/002; F23R 3/12; F05D 2260/96;
(Continued)

(56) References Cited

U.S. PATENT DOCUMENTS

| | | | | |
|---|---|---|---|---|
| 4,529,377 A | * | 7/1985 | Zinn | ......................... F23B 7/00 |
| | | | | 110/347 |
| 4,858,717 A | | 8/1989 | Trinh et al. | |

(Continued)

FOREIGN PATENT DOCUMENTS

| | | |
|---|---|---|
| DE | 103 12 971 A1 | 12/2004 |
| EP | 0 321 809 A1 | 6/1989 |

(Continued)

OTHER PUBLICATIONS

European Search Report dated Jun. 12, 2015.

*Primary Examiner* — Carlos A Rivera
(74) *Attorney, Agent, or Firm* — Buchanan Ingersoll & Rooney PC

(57) ABSTRACT

A method is disclosed for operating an axially staged mixer arrangement with dilution air or dilution gas injection in connection with a combustion arrangement of a gas turbine engine or turbo machinery, having at least one combustion chamber, at least one mixer arrangement for admixing air or gas portions to the hot gas flow leaving the combustion chamber. The mixer arrangement includes a plurality of injectors for admixing air portions to cool at least the hot gas flow leaving combustion chamber. The spacing between the last injection location of acting injectors and at least one subsequently arranged dilution air injection, inside of the mixer arrangement in the hot gas flow, where there is no node between the injection locations, corresponds to a distance equal or approximating to half of convective wave length.

23 Claims, 5 Drawing Sheets

(52) U.S. Cl.
CPC ............... *F23R 3/002* (2013.01); *F23R 3/06* (2013.01); *F23R 3/12* (2013.01); *F23C 2900/07002* (2013.01); *F23R 2900/00014* (2013.01)

(58) Field of Classification Search
CPC . F05D 2260/964; F23M 20/005; F23C 6/042; F23C 9/08; F23C 2900/07002
See application file for complete search history.

(56) References Cited

U.S. PATENT DOCUMENTS

| | | | |
|---|---|---|---|
| 4,929,172 A * | 5/1990 | Zinn | ................. F23C 15/00 431/1 |
| 4,932,861 A | 6/1990 | Keller et al. | |
| 5,588,826 A | 12/1996 | Dobbeling et al. | |
| 2005/0166596 A1 | 8/2005 | Sattinger | |
| 2011/0220433 A1 | 9/2011 | Nakamura et al. | |
| 2014/0033728 A1 | 2/2014 | Marmilic et al. | |
| 2014/0109591 A1 | 4/2014 | Bothien et al. | |

FOREIGN PATENT DOCUMENTS

| | | |
|---|---|---|
| EP | 0 704 657 A2 | 4/1996 |
| EP | 2 725 300 A1 | 4/2014 |
| WO | WO 2012/136787 A1 | 10/2012 |
| WO | WO 2014/063835 A1 | 5/2014 |
| WO | WO 2014/173578 A1 | 10/2014 |

* cited by examiner

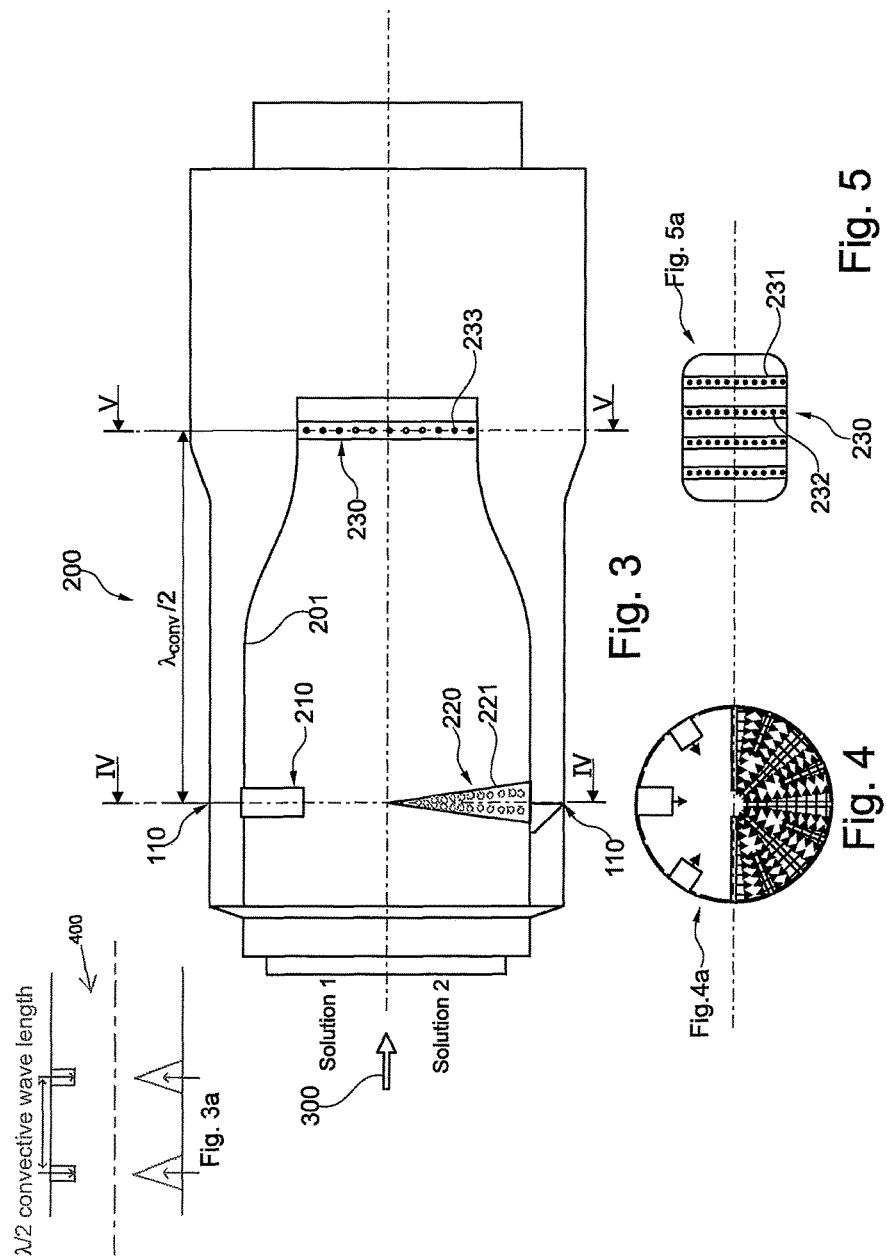

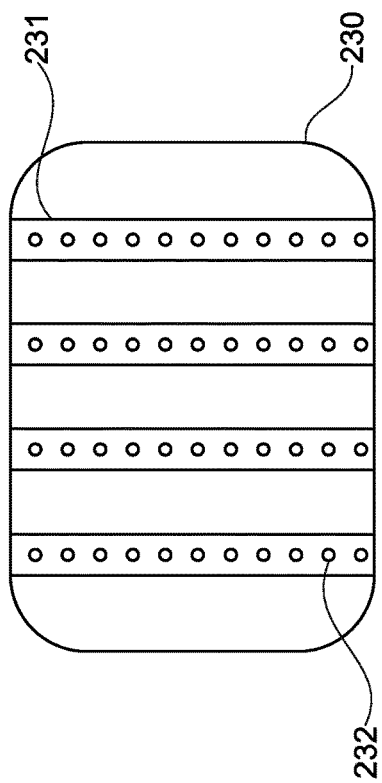
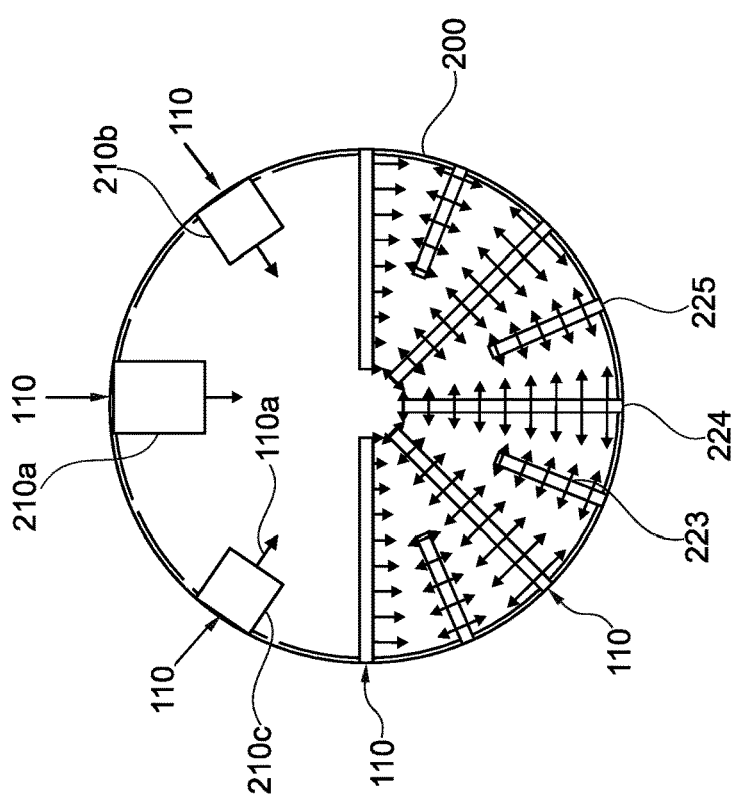

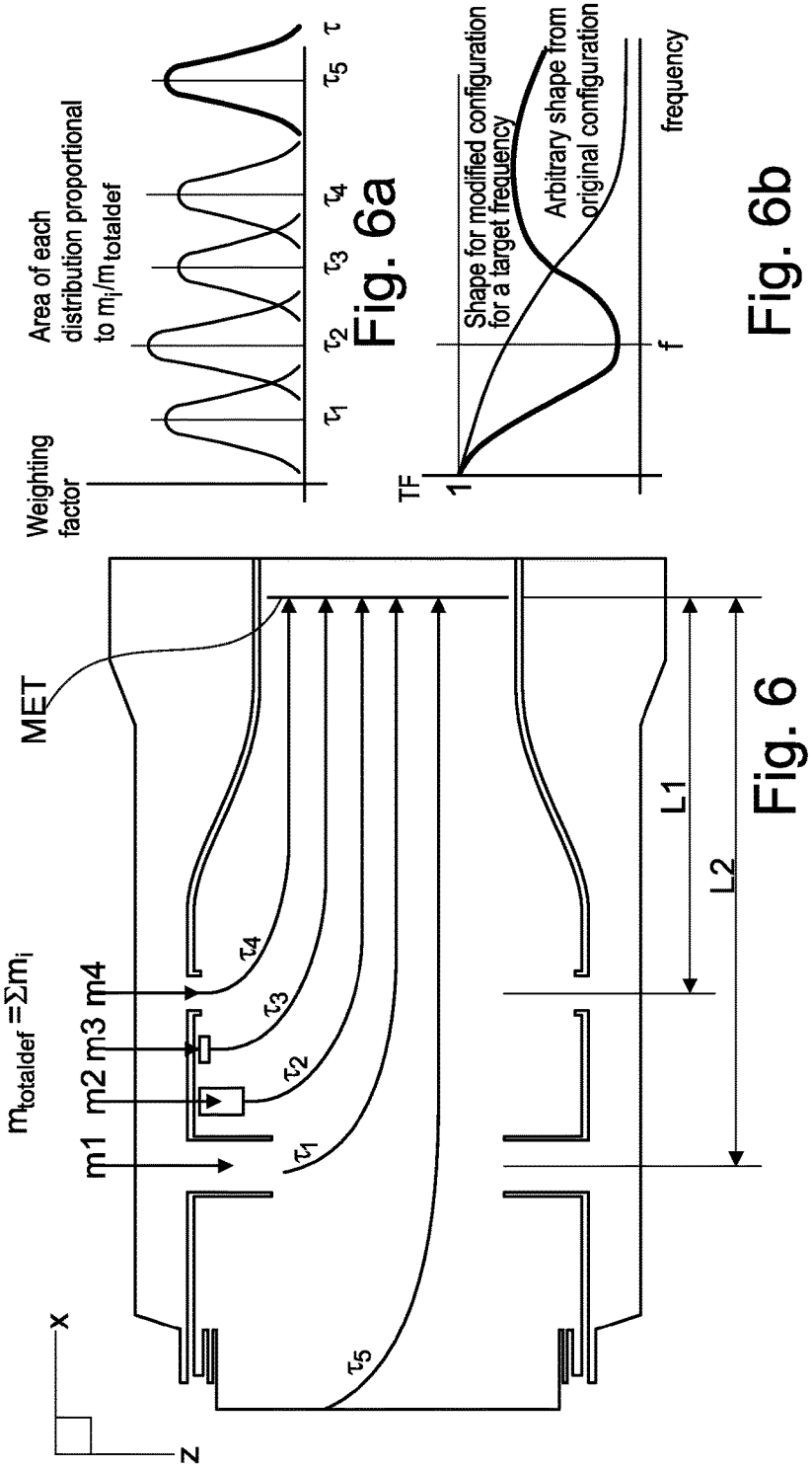

AXIALLY STAGED MIXER WITH DILUTION AIR INJECTION

TECHNICAL FIELD

The invention refers to an axially staged mixer arrangement with dilution air or dilution gas injection in connection with a combustion arrangement of a gas turbine engine or turbo machinery, comprising at least one combustion chamber, at least one mixer arrangement for admixing air or gas portions to the hot gas flow leaving the combustion chamber, wherein the mixer arrangement is adapted to guide combustion gases in a hot gas flow path extending downstream of the combustion chamber, wherein the mixer comprises a plurality of injection means pointing inwards from the side walls of the mixer arrangement for admixing air portions to cool at least the hot gas flow leaving combustion chamber, according to the preamble of the claims 1, 7.

Preferentially, the invention refers to gas turbine engine comprising a single combustor or a sequential combustor arrangement. The sequential combustion arrangement comprising a first burner, a first combustion chamber, a mixer for admixing a dilution gas to the hot gases leaving the first combustion chamber during operation, a second combustion chamber arranged sequentially in a fluid flow connection.

The mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second combustion chamber.

Additionally, the component of an operational arrangement concerns for example a can-combustor of a gas turbine engine. Moreover, an operational arrangement concerns also every other engine that may be subject to a combustion.

As one example the invention refers to a gas turbine engine having a pattern of several can-combustors disposed around rotational contour.

Can-combustors are self-contained cylindrical combustion chambers. Each "can-combustor" has its own fuel injector, igniter, liner, and casing. The primary air from the compressor is guided into each individual can-combustor, where it is decelerated, mixed with fuel, and then ignited. The secondary air also comes from the compressor, where it is fed outside of the liner (inside of which is where the combustion is taking place). The secondary air is then fed, usually through slits in the liner, into the combustion zone to cool the liner via thin film cooling.

Furthermore, multiple can-combustors are arranged around the central axis of the engine, and their shared exhaust is fed to the turbine(s). Can-combustors were most widely used in early gas turbine engines, owing to their ease of design and testing (one can test a single can, rather than have to test the whole system). Can-combustors are easy to maintain, as only a single can needs to be removed, rather than the whole combustion section.

The focused gas turbine engine comprising a compressor, downstream of the compressor several can-combustors, whereas the hot gases of the can-combustors are admitted to a turbine, whereas the can-combustors operating on the basis of can-combustor architecture.

Additionally, another gas turbine engine comprising a compressor, downstream of the compressor first can-combustor arrangement, whereas the hot gases of the first can-combustor arrangement are admitted to a first turbine or to a second can-combustor arrangement, whereas the hot gases of the second can-combustor arrangement are admitted to a second turbine or to a subsequent steam cycle, whereas at least one can-combustor arrangement operating on the basis of a can-combustor architecture.

Furthermore, at least one can-combustor comprising one or more disposed premixing burners or semi-premixing burners. A first turbine is connected to receive working gas from the first can-combustor arrangement, a second can-combustor arrangement is connected to receive exhausted working gas from the first turbine and to deliver working gas to the second turbine, wherein the second can-combustor arrangement comprises an annular duct forming a combustion space extending in a flow direction from outlet of the first turbine to an inlet of the second turbine, and means for introducing fuel into the second can-combustor arrangement for self-ignition combustion.

Moreover, the operational use of the apparatus of the present invention also refers preferably to a further type of combustor, namely is the cannular combustor. Like the can-combustor, can annular combustors have discrete combustion zones contained in separate liners with their own fuel injectors. Unlike the can-combustor, all the combustion zones share a common ring (annulus) casing.

Each combustion zone no longer has to serve as a pressure vessel. The combustion zones can also "communicate" with each other via liner holes or connecting tubes or pipes that allow some air to flow circumferentially. The exit flow from the cannular combustor generally has a more uniform temperature profile, which is better for the turbine section. It also eliminates the need for each chamber to have its own igniter. Once the fire is lit in one or two can-combustors, it can easily spread to and ignite the others.

The combustor of the gas turbine engine comprising at least one premix burner, these should preferably be formed by the combustion process and objects according to the documents EP 0 321 809 A1 and/or EP 0 704 657 A2, wherein these documents forming an integral part of the present description. In particular, said premix burners can be operated with liquid and/or gaseous fuels of all kinds. Thus, it is readily possible to provide different fuels within the individual cans. This means also that a premix burner can also be operated simultaneously with different fuels.

BACKGROUND OF THE INVENTION

Due to increased power generation by unsteady renewable sources like wind or solar existing gas turbine engine based power plants are increasingly used to balance power demand and to stabilize the grid. Thus improved operational flexibility is required. This implies that gas turbines are often operated at lower load than the base load design point, i.e. at lower combustor inlet and firing temperatures.

At the same time, emission limit values and overall emission permits are becoming more stringent, so that it is required to operate at lower emission values, keep low emissions also at part load operation and during transients, as these also count for cumulative emission limits.

State-of-the-art combustion systems are designed to cope with a certain variability in operating conditions, e.g. by adjusting the compressor inlet mass flow or controlling the fuel split among different burners, fuel stages or combustors. However, this is not sufficient to meet the new requirements.

To further reduce emissions and operational flexibility sequential combustion has been suggested in DE 10312971 A1. Depending on the operating conditions, in particular on the hot gas temperature of a first combustion chamber it can be necessary to cool the hot gases before they are admitted to a second burner (also called sequential burner). This cooling can be advantageous to allow fuel injection and pre-mixing of the injected fuel with the hot flue gases of the first combustor in the second burner.

Conventional cooling methods either require heat exchanger structures which lead to high pressure drops in the main hog gas flow or suggest injection of a cooling medium from the side walls. For injection of a cooling medium from the side walls a high pressure drop is required which is detrimental to the efficiency of a gas turbine operated with such a combustor arrangement and a controlled cooling of the whole flow is difficult.

With reference to WO 2014/063835 A1 a sequential combustor arrangement comprising a first burner, a first combustion chamber, a mixer or admixing a dilution gas to the hot gases leaving the first combustion chamber during operation, a second burner, and a second combustion chamber arranged sequentially in a fluid flow connection. The mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner. The mixer comprises a plurality of injection pipes pointing inwards from the side walls of the mixer for admixing the dilution gas to cool the hot flue gases leaving the first combustion chamber.

In addition WO 2014/063835 A1 describes a method for operating a gas turbine with at least a compressor, a combustor arrangement comprising a first burner, a first combustion chamber, a mixer for admixing a dilution gas to the hot gases leaving the first combustion chamber during operation, a second burner and a second combustion chamber arranged sequentially in a fluid flow connection. The mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner. The mixer comprises a plurality of injection pipes pointing inwards from the side walls of the duct for admixing the dilution gas to cool the hot flue gases leaving the first combustion chamber, and a turbine. The dilution gas is admixed into different regions of the cross section of the mixer or the dilution gas is injected through injection holes and/or second injection pipes and first injection pipes in order to introduce dilution gas into different regions of the cross section of the mixer.

Furthermore, attenuation of combustion dynamics by making use of Helmholtz dampers are widely used by all the companies operating in the gas turbine sector and several invention disclosures have been filed. The emerged state of the art focus on damper applications to can-annular-combustors. Adopting a Helmholtz damper around a can-combustor can be seen in the following documents:

US 2005/0166596 A1 describes a through-flow resonator, which when placed at or near the points having the highest acoustical pressure amplitudes within the flow path of a combustor system, effectively dampens instabilities from acoustic energy while avoiding an increase in mass air flow bypassing the system when a portion of the resonator is integral to a section of the system having a thickness in excess of about 0.10 inch. The acoustic damping performance of a resonator may be expressed in terms of acoustic conductance, which is defined as the in-phase component of volume velocity through the downstream set of holes, divided by the amplitude of pressure oscillation at the downstream face of the resonator. A high value of acoustic conductance indicates high damping performance. Consequently, the higher the acoustic conductance of a resonator, the fewer individual resonators required within a system, such as a gas turbine, to minimize potentially damaging combustion oscillations, or the greater the likelihood against the occurrence of such combustion oscillations.

US 2011/0220433 A1 provides the following solutions: A first aspect of the present object is a combustor including a cylindrical body that defines a combustion area therein, and an acoustic damper that includes an acoustic portion having an acoustic-damper resonance space communicating with the combustion area. The acoustic portion is provided along the cylindrical body so as to extend in a direction intersecting an axial direction of the cylindrical body. According to this aspect, because the acoustic portion having the acoustic-damper resonance space is provided along the cylindrical body so as to extend in the direction intersecting the axial direction of the cylindrical body, or the circumferential direction, the acoustic portion is disposed widely in the circumferential direction, without concentrating in a particular area of the cylindrical body in the circumferential direction. As a result, the acoustic portion is prevented from protruding toward the outer circumference of the cylindrical body, and the space needed outside the combustor can be reduced. Thus, because the casing can be made small, the housing constituting the casing can be made small. Because this enables, for example, the gas turbine to be adequately transported on the ground, it is possible to reduce the manufacturing costs, including the transportation costs. Furthermore, if the protrusion of the acoustic portion toward the outer circumference of the cylindrical body is reduced, the combustor can be easily extracted together with the acoustic damper. Thus, it is possible to improve the ease of maintenance of the combustor. The above-described aspect may further include an acoustic liner formed by a porous plate that constitutes the cylindrical body and has a plurality of through-holes penetrating in a thickness direction and a cover member that is provided around and at a certain distance from the porous plate so as to cover the porous plate, the acoustic liner having an acoustic-liner resonance space. By doing so, it is possible to attenuate oscillations in a frequency region that can be attenuated by the acoustic liner and oscillations in a frequency region that can be attenuated by the acoustic damper. Accordingly, it is possible to attenuate combustion oscillations in a wide frequency region. In the above configuration, it is preferable that at least part of the acoustic portion be provided on the outer circumferential side of the acoustic liner.

Accordingly, feeding directly from compressor plenum does not leave enough air for sequential liner cooling. Used air from sequential liner cooling increases risks of hot gas ingestion, overheating in regions with low pressure drop and coupling between hot gas and mixer air plenum. Another solution could be a major pressure drop increase over dilution air, but this releases detrimental effects on engine performance.

SUMMARY OF THE INVENTION

In order to introduce an innovative and inventive contribution to the mentioned state of the art, the basic idea of the present invention concerns to decrease the inlet temperature for the sequential burner to acceptable values, the hot air from the first stage is mixed with colder dilution air or dilution gas (hereinafter called dilution air). This is necessary to achieve the required auto-ignition delay times that strongly depend on temperature. The available pressure drop across the dilution air injection is limited and has to satisfy the requirements prescribed by the overall combustor pressure drop.

Therefore, in case of pressure fluctuations in the combustion chamber which are generated by flame noise or an existing thermo-acoustic instability, this air injection might be modulated resulting in a temporally fluctuating inlet temperature for the downstream burner. This in turn strongly modulates the auto-ignition delay times resulting in flame position fluctuations that might enhance existing combustion dynamics to unacceptable high amplitudes. For this coupling mechanism to occur, that the convective wave length from mixer to sequential burner has to be close to the actual distance (or the distance has to be a multiple of it), which is the case for the CPSC.

The basic idea of the invention is to axially spread the injection of dilution air such that it spans a defined part of the convective wave length. The most basic solution to counteract one distinct pulsation frequency would be to inject the dilution air at two different locations that are separated by half a convective wave length such that they even out. In this simple example, it is assumed that the acoustic wave length is much larger than the convective wave length and that there is no node (node of an acoustic wave, also known as a zero crossing) in between the two injection locations. In the slides attached to this IDF it is shown how the proposed concept could be realized in practice for the CPSC. The typical configuration of an internal CPSC system consists in the fact, that the hot gas coming from the first combustion stage is cooled down to the optimum sequential-burner inlet temperature by injection of dilution air and cooling air, the latter also ensuring that metal temperature limits of the various parts are not exceeded.

Furthermore, the technical problem which the invention intends to solve, refers to obtain the correct positions for the dilution air injection several parameters have to be accounted for as, e.g., mean flow velocity and profile, penetration of dilution air jets, distance to sequential burner flame, frequency of oscillation, acoustic mode shape, and number of critical acoustic modes that have to be addressed.

The axial spacing for best cancellation of the fluctuating dilution air might require a position close to the SB fuel injection. In order to obtain a uniform temperature profile the dilution air might have to be injected via flutes instead of wall jets. This allows a decrease of the injection hole diameters (the overall injection area stays the same) that in turn provides small scale mixing. This results in a shorter mixing length and allows positioning the air injection closer to the SB fuel injection.

Particularly, dilution air injection staged axially by a distance equal or approximating to half of convective wave length ($\lambda_{conv}/2$): A main stream parcel will be exposed to dilution air injection at pressure maximum and minimum at two subsequent stages, thus balancing the fluctuations out (see FIG. 7).

Moreover, the spacing between the last injection location of acting injection pipes or flutes or holes and the subsequent dilution air injector inside of the mixer arrangement in the hot gas flow corresponds on the one hand to a distance equal to half of convective wave length and on the other hand, depending on the operation of the gas turbine, to a distance approximating to half of the convective wave length.

Accordingly, if convective travel time from injection location A to location B is half the convective wave length the reduced mixer mass flow of time t0 is cancelling the increase mass flow from time t1. This is only achievable if there is no node in the acoustic mode shape between the two injection locations.

Due to the addressed low frequency it is more likely that there is no node; but there is a possibility that it may form at least one node. Therefore:

If there is no node between the injection locations you have to space them half the wave length or odd integer multiples of it (i.e., ½, 3/2, . . . (2n+1)/2).

If there is a node between the injection locations, the principle also works but you have to space them a full wave length integer multiples of it (i.e., 1, 2, 3, . . . ).

The subsequent disposed dilution air injections are accomplished by the same or differently structured injection means (pipes, flutes, holes), wherein the spacing between the immediately subordinated injection mean or with respect to the next but one is chosen according to the wave length. Accordingly, the invention comprising also the case where for example the mixer or mixer arrangement having 4 injections means and means ⅓ and ⅔ or ¼ and ⅔ are spaced according to the wave length.

Thus, from this it results the following conclusions:

Current CPSC wall jet mixer leads to large spatial and temporal variations of the applied injection philosophy.

An axially staged mixer with proper spacing can compensate both temporal and spatial fluctuations.

Staging distance should be selected as half convective for a given pulsation frequency.

The staging distance between two subsequent dilution air injections is selected as half convective for a given pulsation frequency, whereby for multiple frequencies, more than two stages are used.

For multiple frequencies, more than two stages have to be used.

Additionally, the invention refers to the following preferred alternative embodiments and/or methods:

An additive dilution air injector is arranged at the outlet of the mixer arrangement, whereby this injector can besides be used, at least partially, as fuel injector, and, moreover, the fuel injection can be mixed or cooled by a quantity of dilution air flowing from a corresponding plenum.

The dilution air flowing from the plenum flows along a connecting duct, which is annularly disposed around the hot gas flow of the mixer arrangement.

The injection means (pipes, flutes) pointing inward from the inner liner of the hot gas flow, and are arranged with a regular or irregular partitioning in circumferential direction of the hot gas flow; and the mentioned injection means having a cylindrical, conical or quasi-conical shape.

The mixer arrangement comprising multiple injection rows along the hot gas flow, wherein the injection means having equal, similar, different protrusion depth, according to the operation of the gas turbine engine or turbo machinery.

The injection means of the mixer having an equal, similar, different cross-section inside of a single injection row or within multiple injection rows, wherein at least the injection means (pipe or flute) of a single row extending to the center of the mixer and are arranged in radial direction inversely to each other; and wherein at least one injection mean (pipe or flute) is inclined with respect to the hot gas flow.

At least one injection pipe or flute having along their protrusion depth a number of injection holes using to inject orthogonally or quasi-orthogonally flowed dilution air into the hot gas flow.

Moreover, the invention refers to a method for operating an axially staged mixer arrangement with dilution air or dilution gas injection in connection with a combustion arrangement of a gas turbine engine or turbo machinery, comprising at least one combustion chamber, at least one mixer arrangement for admixing air or gas portions to the hot gas flow leaving the combustion chamber. The mixer arrangement is adapted to guide combustion gases in a hot gas flow path extending downstream of the combustion chamber, wherein the mixer comprises a plurality of injection means pointing inwards from the side walls of the mixer arrangement for admixing air portions to cool at least the hot gas flow leaving combustion chamber. The spacing between the last injection location of acting injection means and at least one subsequently arranged dilution air injector inside of the mixer arrangement in the hot gas flow corresponds to a distance equal or approximating to half of convective wave length.

Additionally, the method is characterized in that the dilution air flowing from the respective plenum is partially used as effusion and/or convective and/or impingement cooling air with respect to the inner liner of the hot gas flow, wherein the dilution air is preferably originated from at least one compressor, or from the sequential liner cooling, or sequential burner plenum, or pk2 plenum directly, or first stage cooling channel of the gas turbine engine or turbo machinery. A multi-combination of these options is also possible.

Of overriding importance, the mixer fulfills the function of a damper for its operating as a damper for all operating conditions of the gas turbine engine or turbo machinery.

BRIEF DESCRIPTION OF THE FIGURES

The disclosure, its nature as well as its advantages, shall be described in more detail below with the aid of the accompanying figures. Referring to the figures:

FIG. 3 shows a mixer arrangement of a gas turbine engine comprising various introduction modes of dilution air;

FIG. 3a shows a mixer arrangement of a gas turbine engine comprising two sequentially arranged introduction modes of dilution air;

FIG. 4 shows a section through the plane IV-IV of FIG. 3;

FIG. 4a shows the upper part of the cross section of the mixer according to FIG. 4;

FIG. 5 shows a section through the plane V-V of FIG. 3;

FIG. 5a shows a subsequently arranged dilution air injector at the end of the mixer in connection with the convective wave length;

FIG. 6 shows a time lag mixer distribution of injection to end plane (MET) in time domain;

FIG. 6a shows a diagram referring to weighting factors according to FIG. 6;

FIG. 6b shows a diagram referring to a shape for modified configuration for a target frequency according to FIG. 6;

DETAILED DESCRIPTION OF EXEMPLARY EMBODIMENTS

Figure 1:
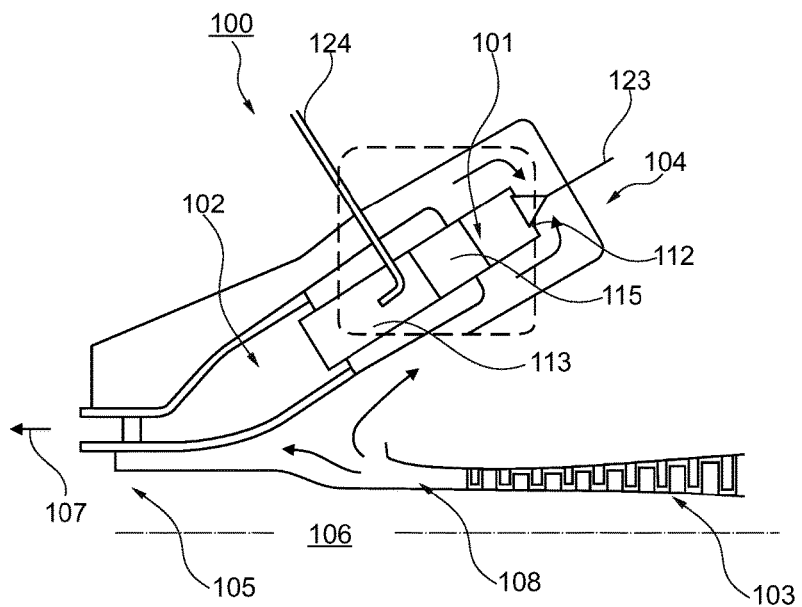
FIG. 1 shows a generic gas turbine engine using sequential combustion with a mixer arrangement for admixing dilution air or a dilution gas.

FIG. 1 shows generalized a gas turbine engine 100 with a sequential combustor arrangement 104 according to the disclosure. It comprises a compressor 103, a combustor arrangement 104, and a turbine 105. The combustor arrangement 104 comprises a first burner 112, a first combustion chamber 101, and a mixer arrangement 115 for admixing a dilution air to the hot gases 109 leaving the first combustion chamber 101 during operation. Downstream of the mixer arrangement 115 the combustor arrangement 104 additionally comprises a second burner 113, and a second combustion chamber 102. The first burner 112, first combustion chamber 101, mixer 115, second burner 113 and second combustion chamber 102 are arranged sequentially in a fluid flow connection. Fuel can be introduced into the first burner 112 via a first fuel injection 123, mixed with compressed air which is compressed in the compressor 103, and combusted in the first combustion chamber 101. Dilution air is admixed in the subsequent mixer arrangement 115. Additional fuel can be introduced into the second burner via a second fuel injection 124, mixed with hot gases 109 leaving the mixer arrangement 115, and combusted in the second combustion chamber 102. The hot gases 109 leaving the second combustion chamber 102 are expanded in the subsequent turbine 105, performing work. The turbine 105 and compressor 103 are arranged on a shaft 106. The remaining heat of the exhaust gas 107 leaving the turbine 105 can be further used in a heat recovery steam generator or boiler (not shown) for steam generation. In the example shown here compressor exit gas is admixed as dilution air. Typically, compressor exit gas is compressed ambient air 108. For gas turbines with flue gas recirculation (not shown) the compressor exit gas is a mixture of ambient air and recirculated flue gas. Typically, the gas turbine system includes a generator (not shown) which is coupled to a shaft 106 of the gas turbine 100.

Figure 2:
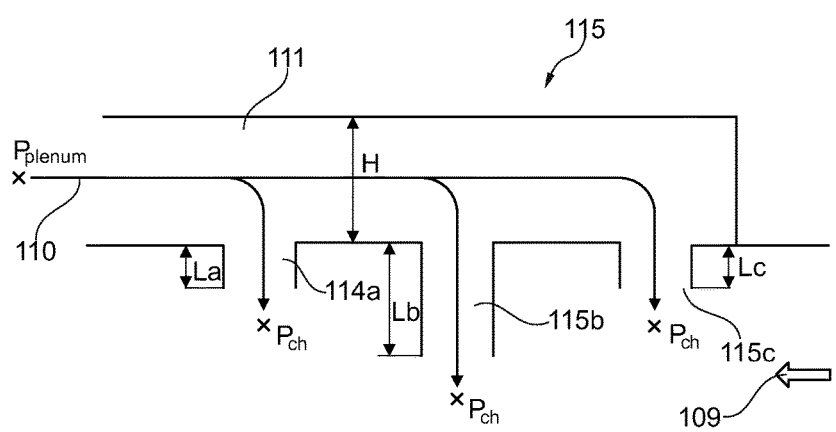
FIG. 2 shows a dilution air mixer according to the state of the art

FIG. 2 shows a dilution air mixer 115 according to the state of the art. In this example compressed gas from the compressor plenum is guided along combustor liner in a connection duct 111 as plenum of the dilution air 110. From the connection duct 111 the dilution air 110 is injected into the mixer via injection pipes 114a-c having various lengths L a-c. The connection duct 111 has a cross section with a height H. The pressure drop between the plenum 111 and the combustion chamber 113 ($P_{plenum} - P_{Combustion\ Chamber\ (ch)}$), that corresponds to the pressure drop through the dilution air pipes 114a-c that is the same for all dilution air pipes. The penetration of the dilution air in the combustion chamber is driven by the pressure drop and the pipe length (protrusion depth).

The dilution air mixer 115 can be arranged with an annular cross section. For an annular dilution air mixer the height H is the difference between the diameter of an outer wall of the annular flow section and the inner wall of the annular flow section. For a dilution air mixer with a cylindrical cross section (can-like mixer arrangement) the height H is the diameter of the cross section. The height L a-c of the various subsequently arranged injection pipes 114a-c are chosen such that good mixing of injected dilution air 110 with the hot gas 109 leaving the first combustion chamber is assured.

FIG. 3 shows the dilution air mixer comprising various structures with respect to the disposed injection means in circumferential direction (see FIGS. 4, 4a)

Thus the mixer comprises a plurality of injection pipes 210 or flutes 220 or holes (not shown) pointing inwards from the side walls of the mixer arrangement for admixing air portions to cool at least the hot gas flow leaving combustion chamber.

Basically, an integration of a type of injection means is made in the whole circumferential direction, namely, based on pipes (Solution 1), or based on flutes (Solution 2), both as shown in FIG. 3 or 4a.

Generally, injection means 210/220 pointing inward from the inner liner 201 of the hot gas flow 300, and are arranged with a regular or irregular partitioning in circumferential direction of the hot gas flow, whereby the injection means having a cylindrical 210, conical 220 or quasi-conical shape.

Additionally, the mixer arrangement can be comprised multiple rows of injection pipe or flute along the hot gas flow with equal, similar, different protrusion depth (see FIG. 6). Furthermore, the injection pipes or flutes of the mixer arrangement having an equal, similar, different cross-section.

The injection pipes or flutes of a single row can be extended to the center of the mixer and can be arranged in radial direction inversely to each other (see FIG. 4b). Alternatively, at least one injection pipe or flute is inclined with respect to the hot gas flow 300.

A preferred alternative includes an embodiment that at least one injection flute having along their protrusion depth a number of injection holes 221 using to inject orthogonally or quasi-orthogonally flowed dilution air into the hot gas flow.

Particularly, dilution air injection 110 staged axially by a distance equal to half of convective wave length ($\lambda_{conv}/2$): A main stream parcel will be exposed to dilution air injection at pressure maximum and minimum at two subsequent stages referring to injection location of the injection means 210/220 and the second or subsequent dilution air injector 230, thus balancing the fluctuations out. This last mentioned dilution air injector 230 comprising a number of dilution air holes 233 (referring to the subsequently disposed dilution air injector see also the description under FIG. 5a).

Moreover, if convective travel time from injection location A to location B is half the convective wave length the reduced mixer mass flow of time t0 is cancelling the increase mass flow from time t1. This is only achievable if there is no in the acoustic mode shape between the two injection locations. Due to the addressed low frequency it is more likely that there is no node; but there is a possibility that it may form at least one node. Therefore: If there is no node between the injection locations you have to space them half the wave length or odd integer multiples of it (i.e., ½, 3/2, . . . (2n+1)/2). If there is a node between the injection locations, the principle also works but you have to space them a full wave length integer multiples of it (i.e., 1, 2, 3, . . . ).

The subsequent disposed dilution air injections are accomplished by the same or differently structured injection means (pipes, flutes, holes), wherein the spacing between the immediately subordinated injection mean or with respect to the next but one is chosen according to the wave length.

Thus, the proposed mixer arrangement can be operated as a damper, reducing thermo-acoustic coupling between hot gas path and mixer air plenum.

FIG. 3a shows a further mixer arrangement 400 of a gas turbine engine comprising two sequentially arranged introduction modes of dilution air within the axial extension. Also from this FIG. 3a it can be seen a method for operating an axially staged mixer arrangement 400 with dilution air or dilution gas injection in connection with a combustion arrangement of a gas turbine engine or turbo machinery, comprising at least one combustion chamber, at least one mixer arrangement for admixing air or gas portions to the hot gas flow leaving the combustion chamber. The shown mixer arrangement is adapted to guide combustion gases in a hot gas flow path extending downstream of the combustion chamber, wherein the mixer comprises a plurality of injection means pointing inwards from the side walls of the mixer arrangement for admixing air portions to cool at least the hot gas flow leaving combustion chamber. Staging distance between at least subsequent disposed dilution air injections is selected as half convective wave length for a given pulsation frequency, whereby for multiple frequencies it is possible using more than two stages. The shown disposed dilution air injections are subsequently disposed and are accomplished by the same or differently structured injection means, namely pipes, flutes, holes, wherein the spacing between the immediately subordinated injection mean or with respect to the next but one is chosen according to the wave length.

FIG. 4 shows a section through the plane IV-IV of FIG. 3; a detailed design can be seen from FIG. 4a.

FIG. 4a shows a baseline of a preferred embodiment of the invention in which a series of injection pipes are mounted radially and fed by at least one plenum dilution air 110 (see FIG. 2, item 111), wherein disposition, geometry and injection behavior of the various pipes are among each other different in the circumferential direction of the mixer 200. The various injection pipes 210a-c are used to inject the flowed dilution air 110a into the hot gas flow 109 (see FIG. 3) and are disposed, according to Solution 1 (see FIG. 3), on the upper half of the mixer, approximately corresponding to the design according to FIG. 2. In contrast, the injection flutes 224, 225 are disposed, according to Solution 2 (see FIG. 3), on the underpart of the mixer 200 are radially directed to the center of the mixer: On the one hand there are a number of long injection flutes 224, and intermediate disposed short injection flutes 225. Both, the long and the short injection flutes are directed radially towards the center of the mixer 200, wherein the long injection flutes 224 extending nearly to the center of the mentioned mixers. The disposition of the injection flutes 224, 225 in the circumferential direction of the mixer is uniformly provided, wherein a non-uniform distribution is also possible. Each injection flute 224, 225 are also equipped with a large number of injection holes 223 and are used to inject the flowed dilution air into the hot gas flow 109 (see FIG. 3). The key feature of this mixer 200 reflects a good distribution of such injection holes 223 along the respective radial extension of the injection flutes 224, 225, so that the dilution air 110 is pre-distributed and therefore requiring a much shorter mixing time and length. In summary, the injection flutes, characterized by conical or other geometries, are arranged to cover the full cross sectional area with dilution air being injected into the hot gas flow, orthogonal to the page. The same considerations apply to the injection pipes 210a-c.

FIG. 5 shows a section through the plane V-V of FIG. 3; a detailed design referring to a dilution air injector arranged at the end of the mixer in connection with the convective wave length can be seen from FIG. 5a.

FIG. 5a shows the second dilution air injector 230, which can be designed in form of a grid structure 231 and it can be unilaterally flow-charged with dilution air 233.

Such injection rate may be dependent on the resulting wave length in connection with the thermodynamic data of the hot gas flow 300 (see FIG. 3) and generally with the combustion procedure.

Moreover, in connection with the injected air dilution 233 through the second dilution air injector 230, it is additionally possible to inject fuel 232 through said air injector.

With regard to this case, this double-functioning injector 230 is arranged in any case at the end of the effective range of the mixer arrangement 200 in connection with the aimed wave length, whereby the fuel injection 232 can be mixed or cooled by a quantity of the mentioned dilution air 233 flowing from an air plenum.

FIG. 6 shows a time lag distribution of injection of dilution air with different identical or similar masses ($m_1$, $m_2$, $m_3$, $m_4$), wherein the lengths $L_1$, $L_2$ of the respective injection location are different with respect to the MET area.

FIG. 6a shows a diagram referring to weighting factors according to FIG. 6; and FIG. 6b shows a diagram referring to a shape for modified configuration for a target frequency according to FIG. 6. The technical content and meaningfulness of the presented diagrams according to FIGS. 6a and 6b are obvious by a person skilled in the art, so that further comments offer no added value and therefore they are unnecessary.

Figure 7:
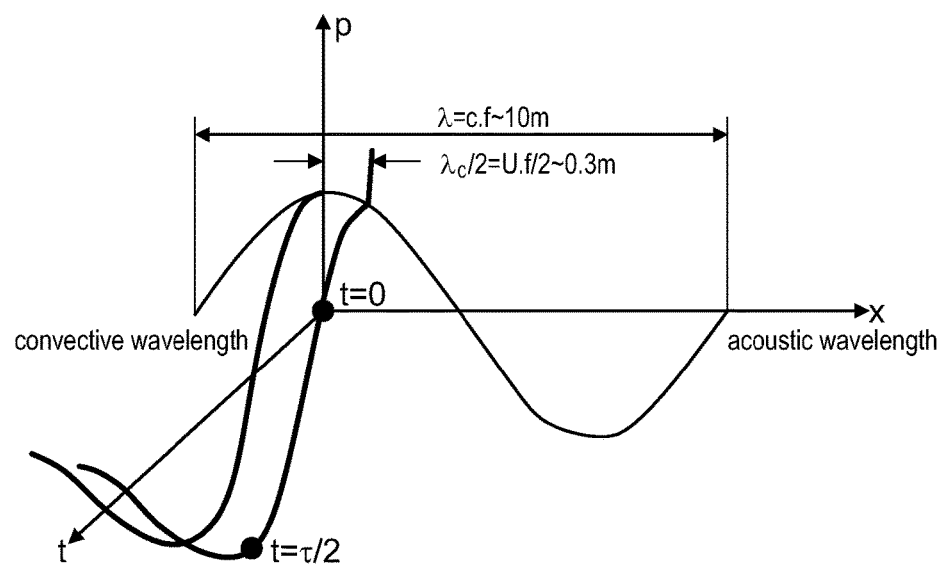
FIG. 7 shows a diagram referring to positioning of dilution air stages.

The same considerations also apply with respect to FIG. 7, which shows a diagram referring to positioning of dilution air stages. From this diagram it is apparent that the dilution air injection is staged axially by a distance equal to half of convective wave length. A main stream parcel will be exposed to dilution air injection at pressure maximum and minimum at two subsequent injection stages, but balancing the fluctuations out.

Thus, the advantages of the embodiments shown here relate to the procedure to decrease the inlet temperature for the sequential burner to acceptable values the hot air from the first stage is mixed with colder dilution air. This is necessary to achieve the required auto-ignition delay times that strongly depend on temperature. The available pressure drop across the dilution air injection is limited and has to satisfy the requirements prescribed by the overall combustor pressure drop. Therefore, in case of pressure fluctuations in the combustion chamber that are generated by flame noise or an existing thermo-acoustic instability, this air injection might be modulated resulting in a temporally fluctuating inlet temperature for the downstream burner. This in turn strongly modulates the auto-ignition delay times resulting in flame position fluctuations that might enhance existing combustion dynamics to unacceptable high amplitudes. For this coupling mechanism to occur, the convective wave length from mixer to sequential burner has to be close to the actual distance (or the distance has to be a multiple of it), which is the case for the CPSC.

It is well to emphasize that the mixing quality of the mentioned mixers is crucial since the burner system of the second chamber referring to a sequential combustion requires a prescribed inlet temperature and inlet velocity profile of the gas flow.

Additionally, all the explained advantages are not limited just to the specified embodiments, methods or combinations but can also be used in other alternatives or alone without departing from the scope of the disclosure. Other possibilities are optionally conceivable, for example, for deactivating individual burners or groups of burners of the mentioned gas turbine engines. Furthermore, the dilution air, or generally dilution medium, can be re-cooled in a cooling air cooler before admixing into the corresponding mixer. Furthermore, the arrangement of the injection or injection holes can be reserved, i.e. for example that the short second injection pipes or flutes can be arranged upstream of the long first injection pipes or flutes. Moreover, there can be additional pipes or flutes types with further length and diameter resp. cross-section combinations.

LIST OF REFERENCES NUMEROUS

100 Gas Turbine
101 First combustor chamber
102 Second combustor chamber
103 Compressor
104 Combustor arrangement
105 Turbine
106 Shaft
107 Exhaust Gas
108 Compressed Air
109 Hot gas flow referring to state of the art
110 Dilution air flow
111 Connecting duct
112 First burner, combustion chamber
113 Second burner, combustion chamber
114a Injection pipe referring to state of the art
114b Injection pipe referring to state of the art
114c Injection pipe referring to state of the art
115 Mixer arrangement referring to state of the art
123 First fuel injection
124 Second fuel injection
200 Mixer
201 Inner liner
210a Injection pipe upper positioned
210b Injection pipe
210c Injection pipe
220 Injection flute
221 Injection hole
223 Injection hole
224 Long injection flute
225 Short injection flute
230 Second dilution air injection
231 Grid structure
232 Fuel injection hole
233 Dilution air injection hole
300 Hot gas flow
400 Mixer arrangement
L a-c Height of the various injection pipes
H Height of the annular dilution air plenum

The invention claimed is:

1. A method for operating an axially staged mixer arrangement with dilution air or dilution gas injection in connection with a combustion arrangement of a gas turbine engine or turbo machinery, having at least one combustion chamber, and at least one mixer arrangement for admixing air or gas portions to hot gas flow leaving the combustion chamber, the method comprising:
guiding, via the at least one mixer arrangement, combustion gases in a hot gas flow path extending downstream of the combustion chamber; and
admixing, via a plurality of injectors pointing inwards from side walls of the at least one mixer arrangement, air portions to cool at least the hot gas flow leaving the combustion chamber, wherein spacing between two adjacent injector locations of the plurality of injectors inside of the at least one mixer arrangement in the hot gas flow, where there is no node of an acoustic wave between the injection locations, corresponds to a distance equal to $(2n+1)/2$ times a convective wave length, where n is an integer $>=0$.

2. The method according to claim 1, wherein, one or more subsequent disposed dilution air injections are accomplished by the same or different injectors that are configured as pipes, flutes, or holes, wherein a spacing between adjacent injectors or with respect to alternate injectors is chosen according to a wave length.

3. The method according to claim 1, comprising:
injecting, via a dilution air injector of the plurality of injectors, a fuel into the hot gas flow.

4. The method according to claim 1, wherein the dilution air flowing from a respective plenum is partially used as effusion and/or convective and/or impingement cooling air with respect to the side walls of the at least one mixer arrangement.

5. The method according to claim 1, wherein, the dilution air is originated from at least one compressor of the gas turbine engine or turbo machinery.

6. A method for operating an axially staged mixer arrangement with dilution air or dilution gas injection in connection with a combustion arrangement of a gas turbine engine or turbo machinery, having at least one combustion chamber, and at least one mixer arrangement for admixing air or gas portions to the hot gas flow leaving the combustion chamber, the method comprising:
guiding, via the at least one mixer arrangement, combustion gases in a hot gas flow path extending downstream of the combustion chamber; and
admixing, via a plurality of injectors pointing inwards from the side walls of the at least one mixer arrangement, air portions to cool at least the hot gas flow leaving combustion chamber, wherein spacing between two adjacent injector locations of the plurality of injectors inside of the at least one mixer arrangement in the hot gas flow, where a node of an acoustic wave between the injection locations is present, corresponds to a distance equal to n times a full wave length, where n is an integer $>=1$.

7. A method for operating an axially staged mixer arrangement with dilution air or dilution gas injection in connection with a combustion arrangement of a gas turbine engine or turbo machinery, having at least one combustion chamber, and at least one mixer arrangement for admixing air or gas portions to hot gas flow leaving the combustion chamber, the method comprising:
guiding, via the at least one mixer arrangement, combustion gases in a hot gas flow path extending downstream of the combustion chamber, and
admixing, via a plurality of injectors pointing inwards from the side walls of the at least one mixer arrangement, air portions to cool at least the hot gas flow leaving combustion chamber, wherein staging distance between two or more subsequently disposed dilution air injections is selected as a half convective wave length for a given pulsation frequency.

8. An axially staged mixer arrangement with dilution air or dilution gas injection in connection with a combustion arrangement of a gas turbine engine or turbo machinery, comprising:
at least one combustion chamber, and
at least one mixer arrangement for admixing air or gas portions to the hot gas flow leaving the combustion chamber, wherein the at least one mixer arrangement is configured to guide combustion gases in a hot gas flow path extending downstream of the combustion chamber, wherein a plurality of injectors pointing inwards from the side walls of the at least one mixer arrangement for admixing air portions to cool at least the hot gas flow leaving combustion chamber, wherein a spacing between two adjacent injector locations of the plurality of injectors inside of the at least one mixer arrangement in the hot gas flow, where there is no node of an acoustic wave between the injection locations, corresponds to a distance equal to $(2n+1)/2$ times a convective wave length, where n is an integer $>=0$.

9. An axial stage arrangement mixer arrangement with dilution air or dilution gas injection in connection with a combustion arrangement of a gas turbine engine or turbo machinery, comprising:
at least one combustion chamber, and
at least one mixer arrangement for admixing air or gas portions to the hot gas flow leaving the combustion chamber, wherein the axially staged mixer arrangement is configured to guide combustion gases in a hot gas flow path extending downstream of the combustion chamber, wherein a plurality of injectors pointing inwards from the side walls of the at least one mixer arrangement for admixing air portions to cool at least the hot gas flow leaving combustion chamber, wherein a spacing between two adjacent injector locations of the plurality of injectors inside of the at least one mixer arrangement in the hot gas flow, where a node of an acoustic wave is present between the injection locations, corresponds to a distance equal to n times a full wave length, where n is an integer $>=1$.

10. The arrangement according to claim 8, wherein one or more subsequent disposed dilution air injections are accomplished by the same or different injectors, wherein spacing between adjacent injectors or with respect to alternate injectors is chosen according to the wave length.

11. The axially staged mixer arrangement according to claim 8, wherein the injectors are configured as pipes or flutes pointing inward from the side walls of the at least one mixer arrangement, and are arranged with a regular or irregular partitioning in a circumferential direction of the hot gas flow.

12. The axially staged mixer arrangement according to claim 8, wherein the injectors are holes pointing inwards from the side walls of the at least one mixer arrangement.

13. The axially staged mixer arrangement according to claim 8, wherein a type of injector is integrated in a whole circumferential direction of an injection location.

14. The axially staged mixer arrangement according to claim 8, wherein an amount of fuel is injected by one or more injectors of the plurality of injectors or downstream of the plurality of injectors.

15. The axially staged mixer arrangement according to claim 8, wherein a dilution air injector is arranged at an end of an effective staging distance of the mixer arrangement.

16. The axially staged mixer arrangement according to claim 8, configured such that the dilution air from a plenum flows along a connecting duct, which is disposed annularly or quasi-annular around a hot gas flow of the mixer arrangement.

17. The axially staged mixer arrangement according to claim 11, wherein the injection pipes or flutes have a cylindrical, conical or quasi-conical shape.

18. The axially staged mixer arrangement according to claim 8, wherein the mixer arrangement comprises: multiple injection rows along a hot gas flow with equal or different protrusion depth.

19. The axially staged mixer arrangement according to claim 11, wherein the injection pipes or injection flutes of the mixer have an equal or different cross-section.

20. The axially staged mixer arrangement according to claim 11, wherein the injection pipes or flutes of a single row extend to a center of the mixer and are arranged in radial direction inversely to each other.

21. The axially staged mixer arrangement according to claim 11, wherein at least one injection pipe or flute, is arranged to incline to a hot gas flow.

22. The axially staged mixer arrangement according to claim 11, wherein at least one injection pipe or flute, includes along a protrusion depth, a number of injection holes to inject orthogonally or quasi-orthogonally flowed dilution air into a hot gas flow.

23. The axially staged mixer arrangement according to claim 8, in combination with a damper that operates as the axially staged mixer arrangement.

* * * * *